(12) United States Patent
Eskes

(10) Patent No.: US 6,371,307 B1
(45) Date of Patent: Apr. 16, 2002

(54) ENVELOPE STYLE FILTER PAPER

(75) Inventor: Don H. Eskes, Fresno, CA (US)

(73) Assignee: Clarification Technology, Inc., Fresno, CA (US)

( * ) Notice: Subject to any disclaimer, the term of this patent is extended or adjusted under 35 U.S.C. 154(b) by 0 days.

(21) Appl. No.: 09/565,263

(22) Filed: May 5, 2000

(51) Int. Cl.$^7$ .............................. B01D 39/00
(52) U.S. Cl. ............... 210/483; 210/315; 210/461; 210/462; 210/463; 210/484; 210/486; 210/488; 210/508; 210/496; 210/502.1; 210/505; 210/DIG. 8; 99/408
(58) Field of Search .................. 210/483–486, 210/488, 495, 496, 502.1, 459, 461, DIG. 8, 167, 463, 460, 462, 507–508, 315, 504–505; 99/355, 403, 408, 279; 206/449–450, 215; 426/77

(56) References Cited

U.S. PATENT DOCUMENTS

| | | | |
|---|---|---|---|
| 2,248,843 A | * | 7/1941 | Atwood |
| 2,282,301 A | * | 5/1942 | Petersen |
| 2,328,148 A | | 8/1943 | Jacobowitz |
| 3,556,392 A | * | 1/1971 | Robin |
| 4,043,916 A | * | 8/1977 | Wecker, Sr. ............ 210/238 |
| 4,229,481 A | * | 10/1980 | Fornari |
| 4,250,039 A | | 2/1981 | Cozzi et al. |
| 4,645,597 A | * | 2/1987 | Wada ............ 210/222 |
| 4,804,466 A | | 2/1989 | Cooper et al. |
| 4,805,525 A | | 2/1989 | Bivens |
| 4,838,327 A | * | 6/1989 | Ambler et al. |
| 4,966,522 A | | 10/1990 | Koyama |
| 5,075,000 A | | 12/1991 | Bernard et al. |
| RE34,636 E | | 6/1994 | Bivens |
| 5,350,443 A | * | 9/1994 | Von Blucher et al. |
| 5,547,568 A | | 8/1996 | Sasaki |
| 5,582,729 A | | 12/1996 | Shioda et al. |
| 5,595,107 A | | 1/1997 | Bivens |
| 5,626,895 A | * | 5/1997 | Gotz |
| 5,725,782 A | * | 3/1998 | Chinn et al. ............ 210/767 |
| 6,010,622 A | * | 1/2000 | Chinn et al. ............ 210/164 |

FOREIGN PATENT DOCUMENTS

FR 2335413 A * 7/1977

* cited by examiner

Primary Examiner—Matthew O. Savage
Assistant Examiner—Marianne Ocampo
(74) Attorney, Agent, or Firm—Christensen O'Connor Johnson Kindness PLLC

(57) ABSTRACT

In accordance with this invention, an improved filter resembling an envelope is disclosed. The filter envelope for the filter frame element includes an enclosure, the enclosure being constructed from planar first and second filter paper members lying atop one another. The first and second filter paper members each have a lateral, medial, base, and top sides, the lateral, medial, and base sides being connected to each other, respectively, to define the enclosure. The top side of the first member is not connected to the top side of the second member so as to define an opening in the enclosure to receive the frame. A closure is formed from a planar third filter paper member which is connected to a portion of the enclosure being proximate to the opening. The third filter paper member is movable between a first position and a second position, the second position being suited to close the opening.

6 Claims, 4 Drawing Sheets

ENVELOPE STYLE FILTER PAPER

FIELD OF THE INVENTION

This invention pertains to filters, and more particularly to a cooking oil filter constructed from filter paper having a closure that moves over an opening in the filter to enclose the frame.

BACKGROUND OF THE INVENTION

Cooking oils, such as those used in commercial or institutional deep fryers, tend to become contaminated with such things as moisture and carbonized food particles during frying. The oils also tend to break down chemically after extended use, often causing the oil to foam, smoke, smell bad, look bad, or taste bad. It has been found that keeping the cooking oil clean by removing the particulate matter and filtering it on a regular basis tends to extend the useful life of the cooking oil, and increase the quality and appearance of foods which are cooked therein.

Accordingly, a variety of specialized systems and filter media for filtering cooking oil have been developed. In most oil filtering systems, the contaminated oil is transferred from the deep fryer to a holding reservoir, pumped under vacuum through a filter medium, and then returned to the deep fryer for further use. One widely used filter system has a flat filter frame made of rectangular top and bottom elements. Companies that manufacture and supply these frames, although not limited to the following, are Henny Penny Corporation, B K Industries, The Dallas Group, Giles Food Service Equipment and Broaster Pressure Fryers. The top and bottom elements are perforated and together make a holder to support the filter medium. The top and bottom elements also form a space in between to allow the oil to flow through the filter to a pump. In such a system, the filter medium can be formed from two carbon filter paper sheets, or one sheet folded over, so as to resemble a pouch. The pouch is formed by having three sides connected or in the case of the folded one sheet, by having two sides connected. The fourth side is open to allow the filter frame to slide in-between the upper and lower sheets of the pouch. The filter, now enclosing the frame is closed with clips or other mechanical devices. The frame may have a nipple which protrudes from the filter. The nipple can be inserted into a connector on a suction line of an oil recirculation pump. The pump provides the driving force to move the oil throughout the system. The frame keeps the filter medium from collapsing due to pressure created by the pump. The contaminated oil then flows through the filter, through the perforations in the frame, into the space created by the top and bottom elements of the frame, eventually reaching the suction line to the pump. The oil can be further processed if so desired. The filter prevents particles from reaching the pump and the remainder of the system. The filter may also neutralize any unpleasant tastes or odors.

The clips and mechanical devices currently used to seal the open end of the filter pouch are unreliable. The clips may not provide an integral seal between the two carbon filter paper sheets. As a result, some oil may bypass the filter through the spaces; the oil that is left unfiltered may lead to unpleasant tasting food. Since there is little resistance in the open spaces, the amount of oil that bypasses the filter can be substantial. The clips may also deform due to normal use which would eventually allow the clips to loosen or fall off.

Therefore, there is a need for a more effective closure for carbon filter paper pouches. The present invention, when used in conjunction with a filter frame element, will provide a more reliable means of closing a filter.

SUMMARY OF THE INVENTION

In accordance with this invention, an improved filter envelope is provided. The filter envelope for a filter frame includes an enclosure, the enclosure being constructed from planar first and second filter paper members lying atop one another. The first and second filter paper members each have a lateral, medial, base, and top sides; the lateral, medial, and base sides being connected to each other, respectively, to define the enclosure. The top side of the first member is not connected to the top side of the second member so as to define an opening in the enclosure to receive the frame. A closure is formed from a planar third filter paper member which is connected to a portion of the enclosure, proximate to the opening. The third filter paper member is movable between a first position and a second position, the second position being suited to close the opening.

In a preferred embodiment, an oil filter is constructed from one elongate sheet of filter paper medium having a lateral and a medial edge, the sheet being divided into a first, second, and third region. The first and second regions have lateral, medial, top and base sides. The third region requires at least a base side. The first region is contiguous with the second region such that the top side of the first region lies adjacent to the base side of the second region, and the second region being contiguous with the third region, such that the top side of the second region lies adjacent to the base side of the third region. The first and third regions are provided with an aperture for engaging a portion of the frame. The filter envelope of a preferred embodiment is formed by folding the first region along a line traversing the contiguous portion between the first and second regions, the line being from the lateral to the medial side. The lateral and medial sides of the first and second regions are then connected together to form an enclosure with an opening. In a preferred embodiment, the sides are stitched. The third region forms the closure for the filter envelope. The third region may be folded along a line traversing the contiguous portion between the second region and the third region, the line being from the lateral to the medial side. In a preferred embodiment, the filter paper medium includes carbon. The first and second regions are shaped to resemble rectangles, and the third region resembles a trapezoid.

In another embodiment, the oil filter is constructed from one irregular shaped sheet of filter paper medium. The filter paper medium has three regions. The first and second regions have lateral, medial, top and base sides. The third region requires at least a base side. The first and second regions are contiguous along the lateral side of one region and the medial side of the other region. The third region is contiguous with the second region such that the top side of the second region lies adjacent to the base side of the third region. The first and third regions are provided with an aperture for engaging a portion of the filter frame element. The filter envelope is formed by folding the first region along a line parallel to the lateral side or the medial side, depending on which side is contiguous to the second region. The fold will lie along a contiguous portion between the first and the second regions. Therefore, if the first region's lateral side is contiguous to the medial side of the second region, the fold is along the contiguous portion connecting both regions. If the first region's medial side is contiguous to the lateral side of the second region, the fold is also along the contiguous portion. In this embodiment, the base regions of the first and second members and the sides which were not contiguous will be connected to form an enclosure. The third region forms the closure for the filter envelope. The third region may be folded along a line traversing the contiguous portion between the second region and the third region, the line being from the lateral to the medial side. The first and second regions are shaped to resemble rectangles, and the third region resembles a trapezoid.

In another embodiment, an oil filter envelope is constructed from three separate and distinct filter paper sheets. The first and second filter paper sheets have lateral, medial, top and base sides. The lateral, medial and base sides are connected to one another respectively, forming an enclosure with an opening for the frame. The closure is formed by connecting a third filter paper sheet proximate to the opening. The third filter paper sheet may move to close the opening formed in the enclosure. The first and third filter paper sheets may have an aperture for engaging a portion of the frame. The first and second sheets resemble rectangles, and the third sheet is trapezoidal shaped.

In another embodiment, the oil filter may be constructed of two filter paper sheets. In this embodiment, one of the two filter paper sheets has two regions. The enclosure may be formed by the filter paper sheet having two regions, each region having lateral, medial, top, and base sides. The regions are contiguous along at least one side. The enclosure is formed by folding along a line in the contiguous portion. Two of the sides are connected to form the enclosure with an opening. The second filter paper sheet forms the closure and is connected proximate to the opening. The second filter paper sheet moves to close the opening. Alternatively, the enclosure may be formed from two filter paper sheets. A first filter paper sheet has lateral, medial, top and base sides, and the second filter paper sheet has two regions. A first region has lateral, medial, top, and base sides to match the lateral, medial, top, and base sides of the first filter paper sheet, and the second region has at least a base side, the base side being contiguous to the top side of the first region. The lateral, medial, and base sides of the first filter paper sheet are connected with the lateral, medial, and base sides of the first region to form the enclosure with an opening. The closure is formed from the second region of the second filter paper sheet. The second region moves along a transverse line in the contiguous portion between the first and second regions to close the opening.

A filter envelope formed in accordance with the present invention is an advancement over the prior art which uses only clips to hold and close the open end of the enclosure. A filter envelope of the present invention eliminates the need to have clips which may fall or otherwise be lost. In addition, a filter envelope of the present invention provides a better seal for the opening in the filter, leading to improved filtration of the cooking oil.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 1:
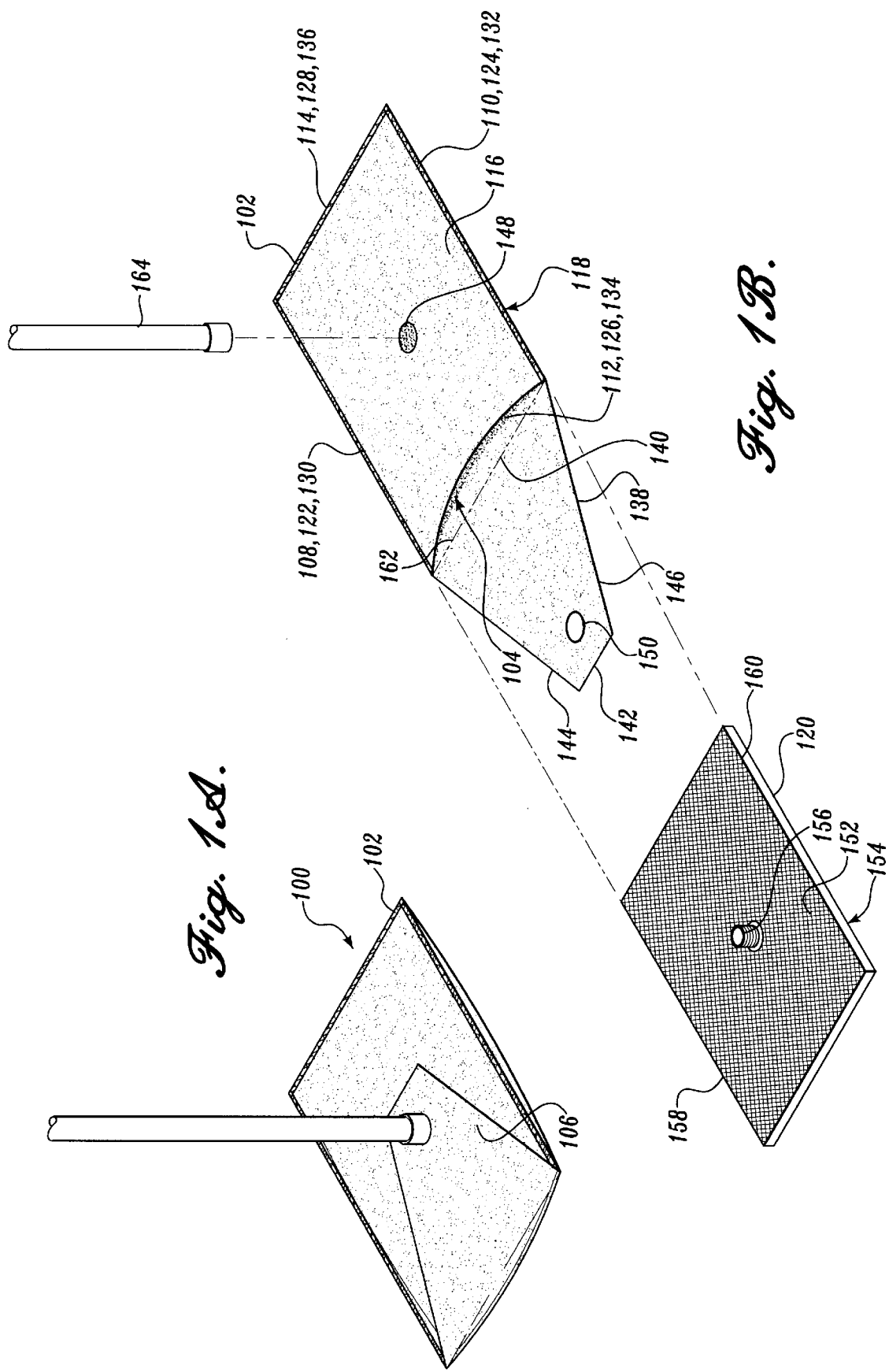
FIG. 1A is a perspective view of a filter envelope of the present invention in use enclosing the frame.
FIG. 1B is a perspective view of a filter envelope of FIG. 1A and frame prior to assembly with a frame.

A filter 100 for filtering cooking oil is illustrated in FIGS. 1A and 1B. The filter 100 is made from filter paper medium comprising absorbent materials such as cellulose and carbon. Preferably, the filter constructed in accordance with this invention finds use in cooking oil service. However, a person of ordinary skill in the art can readily apply a filter constructed in accordance with this invention to suit the desired application. The filter envelope 100 includes an enclosure 102 with an opening 104 and a closure 106 to close the opening 104. The enclosure 102 has a lateral side 108, a medial side 110, opposite the lateral side 108, a top side 112, extending between the lateral side 108 and the medial side 110, and a base side 114, extending between the lateral side 108 and the medial side 110, and also opposite the top side 112. The enclosure is constructed from a planar first filter paper member 116 which forms the upper surface of the enclosure 102 and a second filter paper member 118 which forms the lower surface of the enclosure 102. The first filter paper member 116 and the second filter paper member 118 generally will have the shape of a rectangle. However, the shape of the filter paper members 116 and 118 will generally conform to the shape of the frame 120. Other embodiments of a filter constructed in accordance with the present invention may have varying shapes, sized and configured to suit the desired frame. The first member 116 has a lateral side 122, a medial side 124, a top side 126, and a base side 128. The second member 118 has a lateral side 130, a medial side 132, a top side 134, and a base side 136. The lateral, medial, and base sides of the first member 116 are connected to the lateral, medial and base sides of the second member 118, respectively, to define the enclosure. Embodiments may have lateral sides connected to medial sides and top sides connected to base sides, nevertheless, these embodiments as well are meant to be within the scope of a filter constructed in accordance with the present invention. It should be understood that for purposes of illustration, sides may take on different configurations when shown in the drawings or when regions are moved. The top side 126 of the first member 116 is not connected to the top side 134 of the second member 118, thus, defining an opening 104 in the enclosure 102. The filter 100 also includes a closure 106 formed from a planar third filter paper member 138, having at least a base side 140 which is connected to a portion of the enclosure 102 proximate to the opening 104. The third member 138 is generally in the shape of a trapezoid having four sides. The base side 140 of the third member 138 is parallel to its opposite non-connected side 142, the base side 140 generally being of greater length. The remaining two sides 144, 146 slope from the base side 140 to the opposite side 142. The third filter paper member 138 is movable between a first position and a second position. In the second position, the closure closes the opening 104 as shown in FIG. 1A. The first member 116 and the third member 138 have an aperture, 148 and 150, respectively. Aperture 148 defined in the first member 116 is centrally located, approximately located midway between the lateral side 122 and the medial side 124, and likewise midway between the top side 126 and the base side 128. However, aperture 148 is dependent on the frame assembly used with the filter 100. Other embodiments of the filter constructed in accordance with this invention may have the aperture 148 located where it would most fit the desired frame to be used with the filter.

The location of aperture 148 should not be read as limiting, since the placement of any aperture on the first member 116, dictated by the frame, would fall within the scope of the present invention. For example, the frame may have a plurality of appurtenances projecting above or below the upper and lower surfaces of the frame, then the first and second members would correspondingly be provided with like apertures to accommodate such appurtenances. Likewise, the placement of aperture 150 defined in the third member 138 is dictated by the frame. In this embodiment, the frame dictates aperture 150 be defined in the third member close to or proximate to the furthermost region from the base side 140. Preferably, apertures 148 and 150 are sized and configured in the shape of the appurtenances projecting from the frame, such that in an embodiment, apertures 148 and 150 will be circular to accept circular piping components. Assembled, the first 116, second 118, and third 138 members define a filter 100 in the shape of an envelope.

A frame 120 suitable to fit within the enclosure 102 has an upper surface 152 and a lower surface 154. The upper 152 and lower 154 surface of the frame 120 may each be formed from an individual element, respectively, such that assembled, the upper and lower elements create a space in between for contaminated fluid passage. The upper element and the lower element may be connected by welding, however, this would prevent the elements from being taken apart to clean. Preferably, the upper element and the lower elements are connected with detachable means. In this manner, the elements may be separated for cleaning and inspection. Additionally, the connecting means may also include hinges, such that the lower element and the upper element may open and close with respect to one another. In an embodiment, the filter frame elements are generally rectangularly shaped. However, other shapes may be possible depending on the particular application in which the filter will be used. For example, the filter may be placed within a container having rounded edges. Therefore, the filter frame and the filter may be constructed in a round configuration to fit within the rounded container. The filter frame 120 is preferably made of a durable, rigid material such as steel. The material of construction chosen must be compatible with the process fluid. In cooking oil service, the material must also preferably withstand elevated temperatures. The frame 120 provides support for the filter 100 which will surround the frame 120. Thus, the upper surface 152 of the frame 120 will support the first filter paper member 116, and the lower surface 154 of the frame 120 will support the second filter paper member 118. The operation of the filter and frame will be described in greater detail below. The element forming the upper surface 152 of the frame 120 may also include a connector 156, such as threaded nipple or coupling which can connect to a line. However, there is no reason why a connector may not also be located on the lower surface of the frame as well. There may also be a plurality of connectors on either surface. In an embodiment of the present invention, the frame includes one connector 156 located on the upper element proximate to the center. The connector placement on the frame upper element will determine placement of apertures 148 and 150, on the first 116 and third 138 members of the filter, respectively. The connector 156 may be connected to or formed from the upper or lower element. Connectors are useful for tying the filter and frame combination to a system. Systems may include any recirculating oil treatment system. Preferably, in a system, the connector 156 may attach to the suction side of a pumping unit (not shown). The pumping unit may then distribute the oil to the users or to further processing units. In order for the filter to operate properly, the frame must have perforations to allow the contaminated fluid to flow through the filter and the upper and lower elements of the frame and into the space created by the upper and lower elements. The number and dimensions of the perforations created in the upper and the lower elements will be determined by the design conditions of the system.

In FIG. 1B, filter 100 of the present invention is situated to receive frame 120 through opening 104. For purposes of illustration only, filter 100 is in a prone position. Closure 106 defined by third member 138 is moved to the open position, or if starting with closure open, closure is left open. When the closure 106 is in the open position, opening 104 is exposed to receive the frame 120. Frame 120 is aligned with filter 100, such that the lateral side 108 and the medial side 110 of the filter 100 are substantially in line with the lateral 158 and medial 160 side of the frame 120. Frame 120 is moved into the enclosure 102 until connector 156 is disposed below aperture 148. Connector 156 is inserted through aperture 148, such that connector 156 projects above the first member 116. The closure 106 may move about a transverse line 162 to a second position as shown in FIG. 1A wherein the third member 138 lies atop first member 116. Aperture 150 is passed through connector 156 such that closure 106 is held in the closed position. Preferably, apertures 148 and 150 will not extend into the perforations of the upper 152 surface of frame 120. Connector 156 may be connected to line 164 leading to a pumping unit, for example. Assembled, the filter envelope and frame resemble FIG. 1A.

Figure 2:
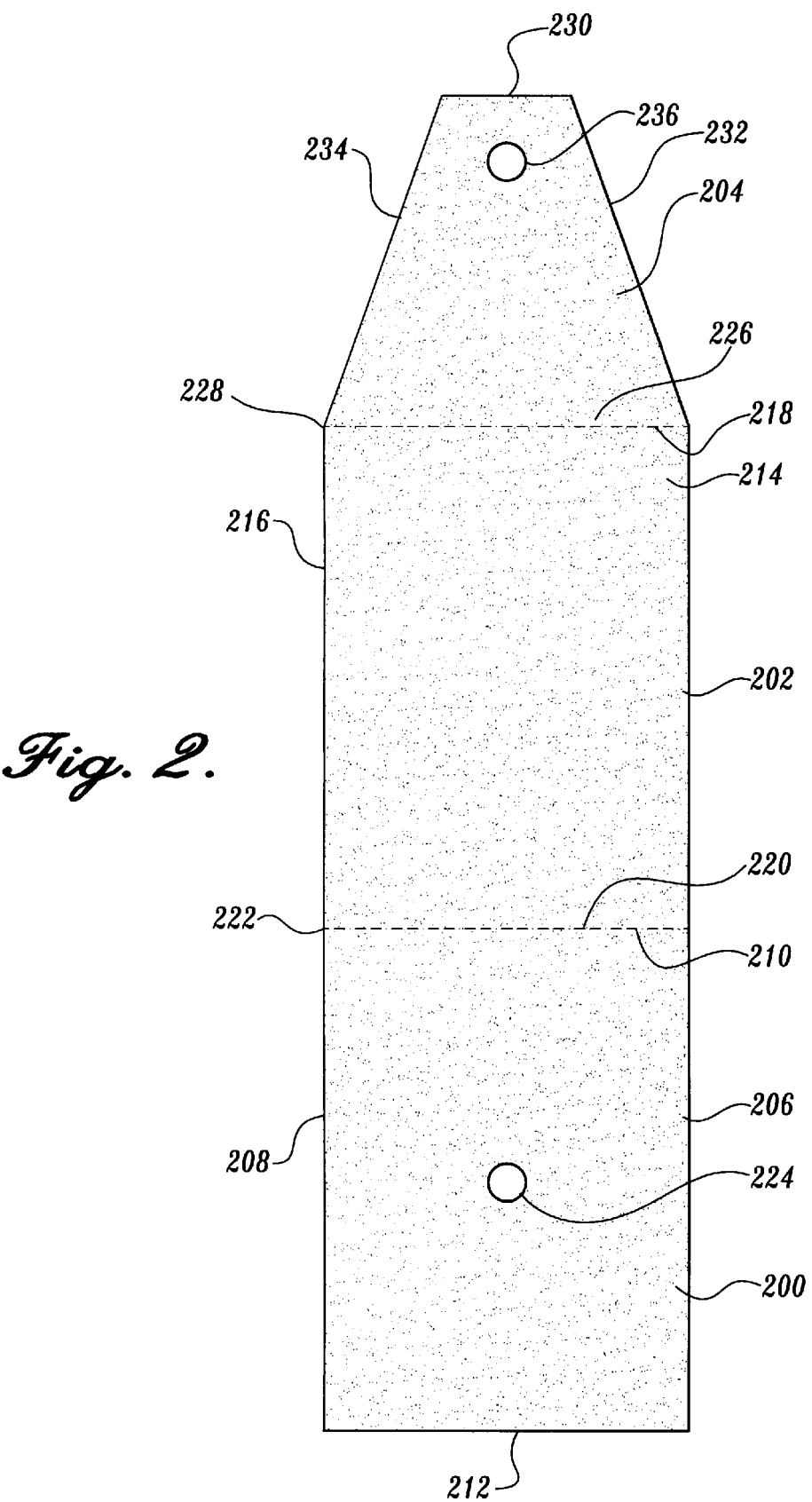
FIG. 2 is a top plan view of one embodiment of a filter envelope of FIG. 1A prior to assembly.

A preferred embodiment of a filter 100 constructed in accordance with the present invention will now be described with reference to FIG. 2. In a preferred embodiment, the envelope style filter 100 can be formed from a single sheet of planar filter paper medium having three regions. As used hereinafter, the three regions define the first, second, and third members of the filter 100, respectively. Also, as used hereinafter, connections between members may be contiguous or accomplished by any suitable connecting means. Also, any filter paper medium used in the filter may be comprised of composites, aggregations, layers, zones or otherwise have discrete or indiscrete changes in composition along the thickness. Preferably, the filter paper medium has carbon and cellulose, but other filtration compositions may be applied and are considered within the scope of the invention. A person of ordinary skill in the art would readily appreciate other suitable filtering media to use in a filter according to the present invention. Generally, in any filtering application, a frame enclosure resembling an envelope may be used to provide more effective sealing.

In a preferred embodiment, the filter paper medium has a first region 200, a second region 202, and a third region 204. In a preferred embodiment, the first region 200 has a lateral side 206, a medial side 208 opposite the lateral side 206, a top side 210 extending between the lateral side 206 and the medial side 208, and a base side 212 extending between the lateral side 206 and the medial side 208 and also opposite the topside 210. Similarly, the second region 202 has a lateral side 214, a medial side 216 opposite the lateral side 214, a top side 218 extending between the lateral side 216 and the medial side 216, and a base side 220 extending between the lateral side 214 and the medial side 216 and also opposite the top side 218. In a preferred embodiment, the first 200 and second 202 regions have a rectangular configuration, while the third region 204 is trapezoidal, however, the shape may often be dictated by the frame which will be received by the filter envelope. Other shapes are possible, such as any polyhedron or rounded shapes. In a preferred embodiment, the top side 210 of the first region 200 is connected to the base side 220 of the second region 202. In a preferred embodiment, the first connecting portion 222 is contiguous. However, other embodiments may be connected through the use of other connecting means, such as stitching, glue, welding, heat bonding, etc. A person of ordinary skill in the art will readily be knowledgeable in the most appropriate connecting means suitable for the particular application of the filter. A first aperture 224 may be provided in the first region 200 to engage a portion of the frame 120 therethrough. Aperture 224 is located approximately midway between the lateral side 206 and the medial side 208, and likewise midway between the top side 210 and the base side 212 of the first region 200. In a preferred embodiment, third region 204 has at least a base side 226, which is connected to the top side 218 of the second region 202. In a preferred embodiment, the second connecting portion 228 is contiguous, however, other embodiments may have connecting means, such as stitching, glue, welding, heat bonding, etc. In a preferred embodiment, third region 204 may also include a side 230 opposite the base side 226. Base side 226 is substantially parallel to side 230, but base side 226 is about twice the length of side 230. Lateral and medial sides 232 and 234, respectively, slope from base side 226 to opposite side 230. The third region 204 has a second aperture 236 for engaging a portion of the frame 120 therethrough. In a preferred embodiment, second aperture 236 is located opposite the base side 226. In a preferred embodiment, both first 224 and second 236 apertures are circular to fit circular piping components.

Figure 3:
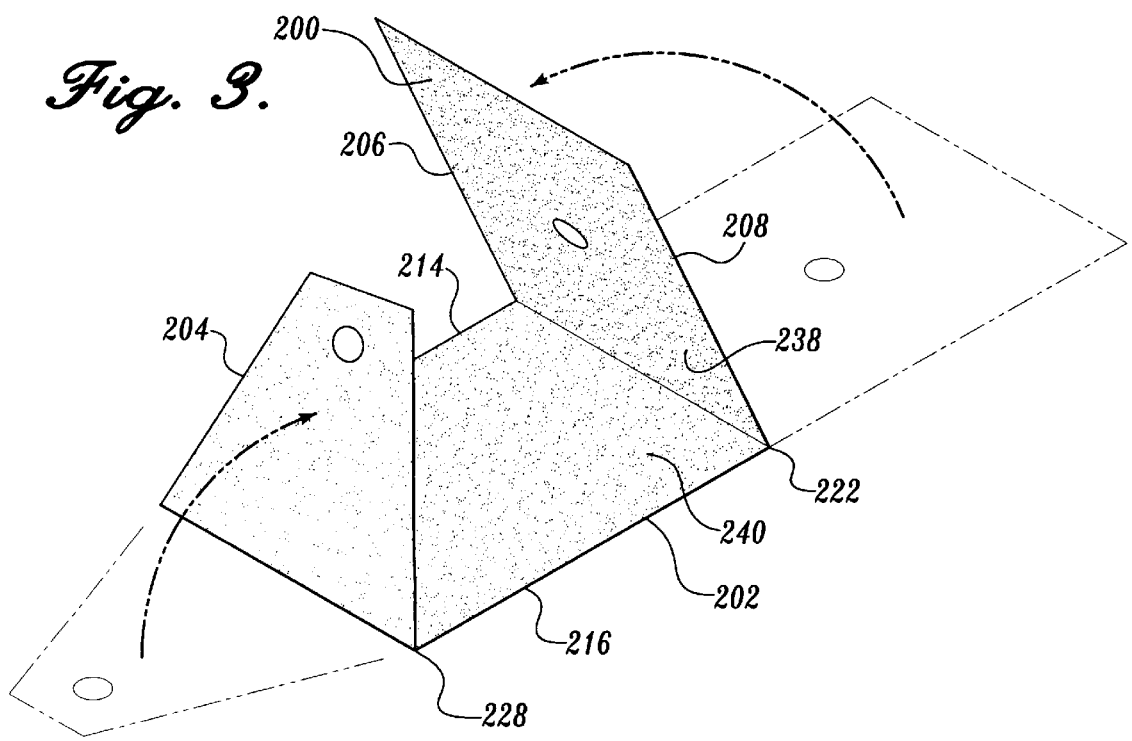
FIG. 3 is a perspective view of how the embodiment of FIG. 2 is assembled.

The assembly of a preferred embodiment of a filter according to the present invention will now be described with reference to FIG. 3. The filter paper medium used to create the envelope style filter is preferably made from a flexible material to allow bending in the transverse direction as shown in FIG. 3. Other embodiments may have bending in the longitudinal direction as well, as will be described later. However, embodiments which do not rely on folding for connecting one region to another region may not necessarily need to be flexible enough to allow for folding. To begin, first region 200 is moved axially, or folded, about a transverse line in the first connecting portion 222, so that the upper surface 238 of the first region 200 faces the upper surface 240 of the second region 202. The first region lateral side 206 can now be stitched to the second region lateral side 214, and the first region medial side 208 can now be stitched to the second region medial side 216. A person of ordinary skill in the art may readily apply other well known connecting means besides stitching, such as glue, welding, heat bonding, etc. The first 200 and second 202 regions now form the first 116 and second 118 members of the filter 100. When the first 116 and second 118 members are constructed as just described, they will form an enclosure 102 with an opening 104 for receiving a frame 120 (shown in FIG. 1B). A closure 106 is defined by the third region 204 which is adapted to move axially, or folded, about a transverse line in the second connecting portion 228.

Figure 4:
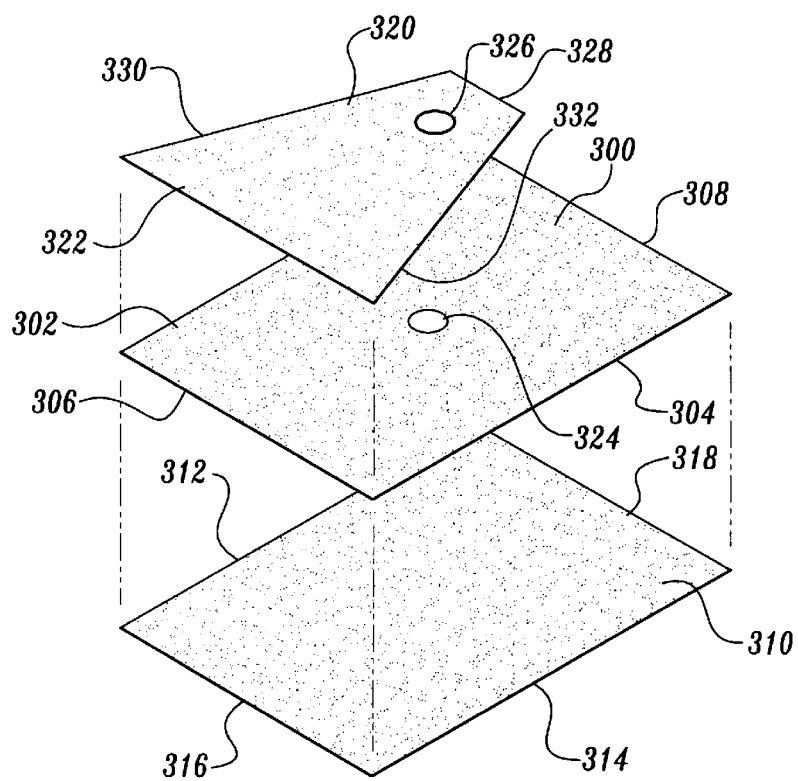
FIG. 4 is a perspective view of another embodiment of a filter envelope of the present invention prior to assembly.

In another embodiment as shown in FIG. 4, the filter 100 is constructed from three separate and distinct filter paper sheets. In this embodiment, one filter paper sheet forms one member of the filter, though other embodiments may use one filter paper sheet to form two or more members, as in a preferred embodiment or as will be described in further embodiments. In this embodiment, a first sheet 300 has a lateral side 302, a medial side 304 opposite the lateral side 302, a top side 306 extending between the lateral side 302 and the medial side 304, and a base side 308 extending between the lateral side 302 and the medial side 304 and also opposite the top side 306. A second sheet 310 has a lateral side 312, a medial side 314 opposite the lateral side 312, a top side 316 extending between the lateral side 312 and the medial side 314, and a base side 318 extending between the lateral side 312 and the medial side 314 and also opposite the top side 316. Both first 300 and second 310 sheets are substantially rectangularly shaped. The first sheet 300 is positioned substantially over the second sheet 310, such that the all sides of the first 300 and the second 310 sheet are substantially aligned with each other, respectively. Alternatively, the top side 316 of the second sheet 310 may project slightly beyond the top side 306 of the first sheet 300. This slight extension is for connecting a third sheet 320. The first sheet 300 and the second sheet 310 are not contiguous with each other along any side, therefore connecting means between the lateral 302, medial 304, and base 308 sides of the first sheet 300 with the lateral 312, medial 314, and base 318 sides of the second sheet 310 are necessary. Connecting means may be stitching, glue, welding, heat bonding, etc. Once connected, the first and second sheets now form the first 116 and second 118 members of the enclosure 102 with an opening 104. In this embodiment, third sheet 320 has at least a base side 322. Third sheet 320 is substantially trapezoidal shaped, the base side 322 being substantially parallel to its opposite side 328, the base side 322 being about twice the length of its opposite side 328. Lateral and medial sides 330 and 332, respectively, slope from base side 322 to the opposite side 328. Base side 322 of third sheet 320 is not contiguous with the second sheet 310 either, therefore base side 322 of third sheet 320 may be connected by connecting means to the top side 316 of the second sheet 310. Varying locations for connecting base side 322 of third sheet 320 to the top side 316 of second sheet 320 are possible. In an embodiment, edge of base side 322 may be connected directly adjacent to the edge of top side 316 of the second sheet 310. Alternatively, base side 322 of the third sheet 320 may curl under and be connected to underside of second sheet 310. Still in another embodiment, the base side 322 of third sheet 320 may be connected to the upper side extension of second sheet 310 beyond first sheet 300. Alternatively, in some embodiments the base side 322 of third sheet 320 may be connected to any portion of the second sheet 310 or the first sheet 300, for example, an elongated third sheet may extend beyond top side of second sheet, perhaps wrapping around to the upper side of the first sheet. These embodiments are fully within the scope of a filter constructed in accordance with the present invention. The first sheet 300 and the third sheet 320 may have apertures 324 and 326, respectively, defined therein for engaging a portion of the frame 120, such as a connector 156. Aperture 324 on first sheet 300 is located proximate the center of the sheet. Aperture 326 on third sheet 320 is located proximate opposite side 328 of base side 322. Preferably, apertures 324 and 326 are circular to accept circular piping components. The third sheet 320 forms the closure 106 for the opening 104 created by the first member 116 and the second member 118.

Figure 5:
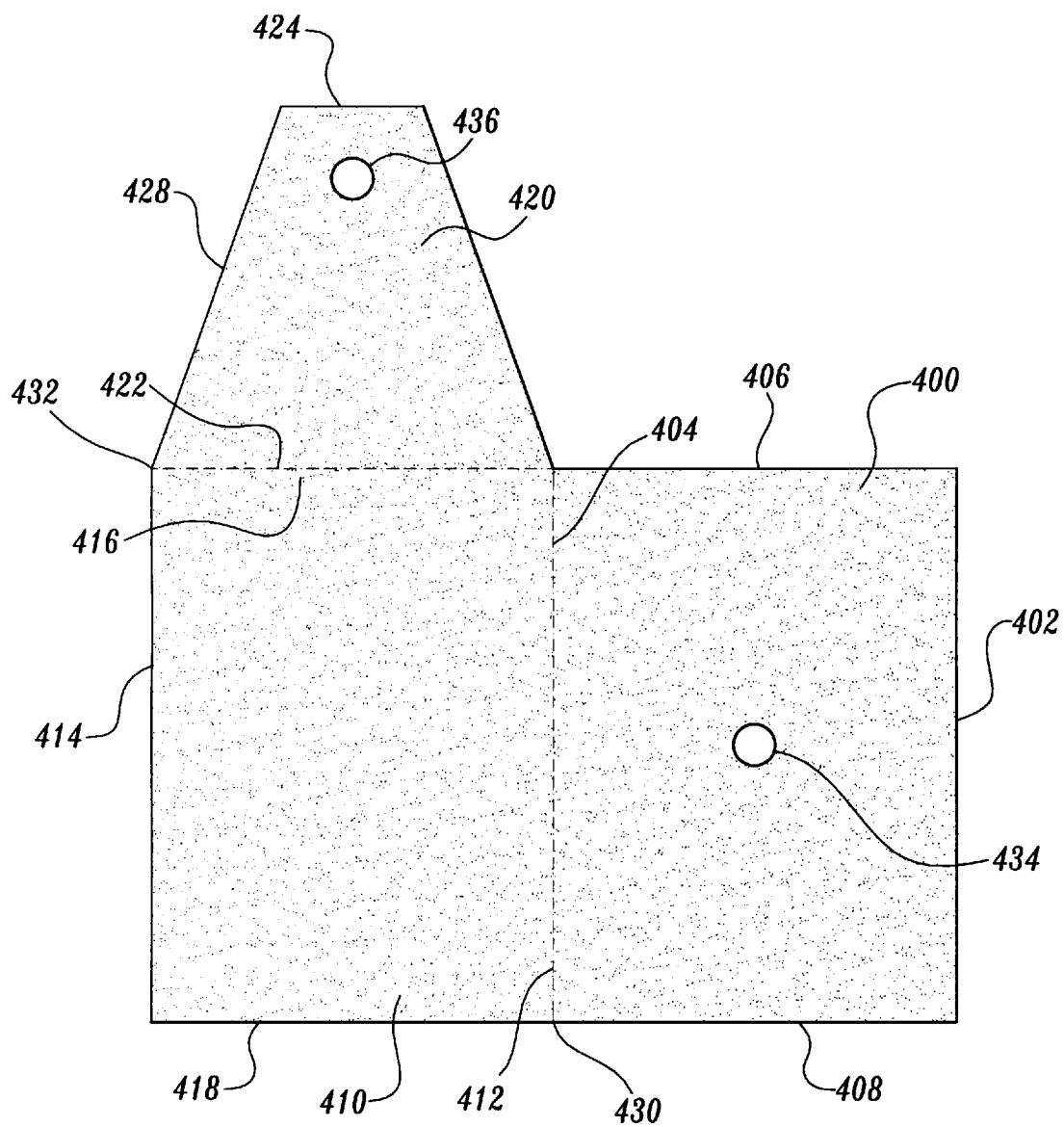
FIG. 5 is a top plan view of another embodiment of a filter envelope of the present invention prior to assembly.

FIG. 5 describes yet another embodiment. In this embodiment, the oil filter is formed from an irregular shaped sheet of filter paper medium. The filter paper medium has three regions. The first region 400 has a lateral side 402, a medial side 404 opposite the lateral side 402, a top side 406 extending between the lateral side 402 and the medial side 404, and a base side 408 extending between the lateral side 402 and the medial side 404 and also opposite the top side 406. The second region 410 has a lateral side 412, a medial side 414 opposite the lateral side 412, a top side 416 extending between the lateral side 412 and the medial side 414, and a base side 418 extending between the lateral side 412 and the medial side 414 and also opposite the top side 416. The third region 420 has at least a base side 422. The third region 420 may also include a side 424 opposite the base side 422, and a lateral and medial side, 426 and 428, respectively. Both first 400 and second 410 region are substantially rectangularly shaped. Third region 420 is substantially trapezoidal shaped, with base side 422 substantially parallel to side 424. Base side 422 being about twice the length of side 424. Lateral 426 and medial 428 sides sloping from base side 422 to opposite side 424. In this embodiment, the medial side 404 of the first region 400 is contiguous to the lateral side 412 of the second region 410. However, other embodiments may have alternatives where a lateral side 402 of the first region 400 is contiguous with the medial side 414 of the second region 410. The enclosure 102 of the filter 100 is formed by moving the first region 400 about a longitudinal line in the contiguous portion 430 between the medial side 404 of the first region 400 and the lateral side 412 of the second region 410. Were the first region 400 contiguous with the second region 410 on the opposite side (i.e., the lateral side 402 of the first region 400 contiguous with the medial side 414 of the second region 410), the first region 400 would be moved about a longitudinal line in the opposite contiguous portion (not shown). The base side 408 of the first region 400 is connected to the base side 418 of the second region 410 and the lateral side 402 of the first region 400 is connected to the medial side 414 of the second region 410 using any suitable connecting means, such as stitching, glue, welding, heat bonding, etc., to form the first 116 and second 118 members of the enclosure 102 with an opening 104. The third region base side 422 is contiguous with the second region top side 416 at a contiguous portion 432. The third region 420 forms the closure 106. The third region 420 moves about a line along the contiguous portion 432 to close the opening 104. The first region 400 and the third region 420 may have apertures 434 and 436, respectively, defined therein for engaging a portion of the frame 120, such as a connector 156. Aperture 434 on first region 400 is located proximate the center of the region. Aperture 436 on third region 420 is located proximate opposite side 424 of base side 422. Preferably, apertures 434 and 436 are circular to accept circular piping components.

In yet another embodiment (not shown), the oil filter envelope may be constructed of two filter paper sheets. One of the two filter paper sheets has two regions. The enclosure may be formed by one filter paper sheet having a first and second region, each region having a lateral, medial, top, and base sides. The regions are contiguous along at least one side. The enclosure is formed by folding along a line in the contiguous portion. Two of the noncontiguous sides are connected, thus forming the first and second members of the enclosure with an opening. The second filter paper sheet forms the closure and is connected by connecting means in the area proximate to the opening. The second filter paper sheet moves to close the opening in the enclosure. Alternatively, the enclosure may be formed from two filter paper sheets, one sheet still having two regions. A first filter paper sheet has lateral, medial, top and base sides, and the second filter paper sheet has two regions. A first region has lateral, medial, top, and base sides to match the lateral, medial, top and base sides of the first filter paper sheet, and the second region has at least a base side, the base side being contiguous to the top side of the first region. The second region will define the closure. The lateral, medial, and base sides of the first filter paper sheet are connected with the lateral, medial, and base sides of the first region to form the first and second members of the enclosure with an opening. The closure is formed from the second region of the second filter paper sheet. The second region moves along a transverse line in the contiguous portion between the first and second regions to close the opening in the enclosure.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A filter envelope for a filter frame element, comprising:

a filter frame enclosure comprising planar first and second filter paper members lying atop one another, the first and second members defining lateral, medial, and base sides, the lateral, medial, and base side of the first member connected to the lateral, medial, and base side of the second member to define the enclosure, the top side of the first member not being connected to the top side of the second member so as to define an opening in the enclosure, and a closure comprising a planar third filter paper member connected to a portion of the second member proximate to the opening, the third member movable between a first position and a second position, the second position closing the opening in the enclosure wherein the first member of the enclosure has a first aperture for engaging a portion of the frame filter element therethrough and the third member has a second aperture for engaging a portion of the frame filter element therethrough.

2. The filter envelope of claim 1, wherein the first member defines a tetragon shape, the second member defines a tetragon shape, and the third member defines a tetragon shape.

3. The filter envelope of claim 2, wherein the first member is substantially a rectangle, the second member is substantially a rectangle, and the third member is substantially a trapezoid.

4. The filter envelope of claim 3, wherein the filter paper comprises carbon.

5. The filter envelope of claim 1, wherein said three members are connected by a fold, adhesive, stitching, or any combination thereof.

6. The filter envelope of claim 1, wherein said envelope is formed from one, two, or three filter papers.

* * * * *